United States Patent
Bergan et al.

[11] Patent Number: 5,813,475
[45] Date of Patent: Sep. 29, 1998

[54] HARDFACED AGRICULTURAL SWEEP AND METHOD FOR APPLYING HARDFACING

[75] Inventors: Timothy J. Bergan, Plainfield; Jimmy R. Kreftmeyer, Minooka; Edward Norman A. Rahe, Downers Grove; James L. Sherman, Naperville; Christopher J. Shutts, Schaumburg; John T. Sponzilli, Warrenville, all of Ill.

[73] Assignee: Case Corporation, Racine, Wis.

[21] Appl. No.: 878,013

[22] Filed: Jun. 18, 1997

[51] Int. Cl.⁶ .................................................. A01B 39/20
[52] U.S. Cl. ........................... 172/719; 172/721; 172/722
[58] Field of Search ............................ 37/460, 456, 458; 175/348; 219/76.12, 76.14; 172/701.1, 701.3, 112, 49.5, 747, 737, 722, 723, 725, 719, 720, 730

[56] References Cited

U.S. PATENT DOCUMENTS

| | | | |
|---|---|---|---|
| 1,988,108 | 1/1935 | Bingham | 219/8 |
| 4,091,253 | 5/1978 | Bagshow et al. | 219/76.14 |
| 4,243,727 | 1/1981 | Wisler et al. | 219/76.14 X |
| 4,408,667 | 10/1983 | Jarvis | 172/730 X |
| 4,415,042 | 11/1983 | Cosson | 172/749 |
| 4,457,381 | 7/1984 | Wetmore | 172/722 |
| 4,459,328 | 7/1984 | Mizuhara | 427/192 |
| 4,580,639 | 4/1986 | Johnson | 172/730 |
| 4,645,013 | 2/1987 | Edmisson | 172/730 |
| 4,647,749 | 3/1987 | Koshy | 219/76.14 |
| 4,745,256 | 5/1988 | Schubert | 219/121 PL |
| 4,782,206 | 11/1988 | Ayres et al. | 219/76.14 |
| 4,787,462 | 11/1988 | Nichols | 172/730 |
| 4,837,417 | 6/1989 | Funk | 219/76.14 |
| 4,850,435 | 7/1989 | Morris et al. | 172/730 |
| 4,867,248 | 9/1989 | Robertson et al. | 172/753 |
| 4,897,519 | 1/1990 | Clark et al. | 219/76.14 |
| 5,111,600 | 5/1992 | Lukavich et al. | 38/141 T |
| 5,207,279 | 5/1993 | Nelson | 172/140 |
| 5,259,461 | 11/1993 | Cochrane | 172/730 |
| 5,267,619 | 12/1993 | Eversole | 172/572 |
| 5,281,789 | 1/1994 | Merz et al. | 219/76.15 |
| 5,456,323 | 10/1995 | Hill | 172/721 |
| 5,499,686 | 3/1996 | Parker | 172/730 |

*Primary Examiner*—Michael J. Carone
*Assistant Examiner*—Robert Pezzuto
*Attorney, Agent, or Firm*—Jansson, Shupe, Bridge & Munger, Ltd.

[57] ABSTRACT

An agricultural sweep has a main body with a cutting edge including a tip and winged portions extending away from the tip. The tip and winged portions have hardfacing material on them. In the improvement, the width of the hardfacing material on the tip is greater than the width of the hardfacing material on the winged portions, thereby conforming the location of hardfacing material to a soil pressure gradient along the cutting edge. A new method for applying a hardfacing material to an agricultural sweep includes the steps of (a) determining a face pressure gradient resulting from soil passing across the face and applying hardfacing material to those portions of the face at which the gradient exceeds a predetermined value.

15 Claims, 4 Drawing Sheets

HARDFACED AGRICULTURAL SWEEP AND METHOD FOR APPLYING HARDFACING

FIELD OF THE INVENTION

This invention relates generally to earthworking and, more particularly, to tools of the non-rectangular connection type with hardfacing.

BACKGROUND OF THE INVENTION

Throughout history, various types of implements have been used to till the soil. Such implements have ranged from crude wooden plows to, more recently, modern cultivating tools such as disks, plows, and harrows. No matter what their design, however, all of these implements serve a common purpose in that they are used to turn and work the soil or otherwise promote the growth of row-planted crops.

One type of tillage tool is known as a sweep. Agricultural sweeps are mounted on a gang implement which holds the sweeps at a position to travel just below the surface of the earth. This allows the sweep to cut off weeds just below surface level—thereby preventing the weed's roots from being exposed to sunlight—and breaks up tiny capillary-like passages through which water evaporates. Weed growth is inhibited and water retention is improved.

Sweeps are shown in several U.S. patents, examples of which include U.S. Pat. Nos. 5,456,323 (Hill), 4,457,381 (Wetmore), and 4,408,667 (Jarvis). Because soil is abrasive (even at the relatively-low speeds at which sweeps are drawn through soil), sweeps gradually wear away in service. At least as evidenced by the patent literature, the agricultural industry is concerned with developing ways to extend the longevity of agricultural sweeps. One common way of doing so involves the application of hardfacing material to the cutting edge of the sweep.

The Hill patent shows an agricultural sweep designed for attachment to a tractor. Such sweep includes a ground engaging portion having a cutting edge and a stem portion for attaching the ground engaging portion to a tractor. Applied to the stem and/or cutting edge of the ground engaging portion is an extended wear portion for rendering the stem and/or cutting edge of the ground engaging portion resistant to abrasion.

A shortcoming of the Hill invention is that the extended wear portion is applied at the same width across the entire cutting edge. Such application results in abrasion protection being applied in areas were it is least needed. And, in view of the invention, surfaces which should be coated with wear-resistant metal are not. Following the Hill teaching does not necessarily result in optimum wear characteristics combined with a high degree of cost effectiveness.

The Wetmore patent discloses a stubble mulch sweep that includes a pair of divergent wings each detachably connected at one end of a rigid overlay of V-shaped cross section. Such overlay has, at its forward end, a point of hardened, abrasion resistent metal. While such hardened metal is helpful in preventing abrasion of the overlay, it offers no protection to the cutting edge of the divergent wings.

The Jarvis patent shows an agricultural share that is formed of metal and has two sides that converge together to form a point. Rather than use a weld-like hard surface material, separate, hardened metal strips are bonded to the front of the share along at least a part of each of its sides. The strips are of substantially equal width along their respective lengths and, it is believed, providing and attaching separate hardened strips is a relatively-costly undertaking.

And the application of hardfacing material to devices used in earth working is not limited to agricultural sweeps. Devices such has the teeth attached to an excavation bucket have been known to have hardfacing material applied to selected surfaces that come in contact with the earth. That approach is disclosed in U.S. Pat. No. 5,111,600 (Lukavich et al.).

Although the application of hardfacing material to the cutting edge of an agricultural sweep is generally satisfactory, the known ways of doing so are not without disadvantages. For example, because of the labor and material costs relating to hardfacing are significant, it would be more economical if the hardfacing could be applied only to areas that encounter the greatest abrasion. But the prior art has failed to recognize how to do so.

In addition, the application of hardfacing (a process somewhat like welding and involving small amounts of hot, molten metal) tends to soften the underlying material that forms the cutting edge. A material that could be strategically applied to areas subject to the greatest amount of wear without substantially weakening the underlying metal being protected would be a great improvement in the art.

OBJECTS OF THE INVENTION

An object of the invention is to provide a new agricultural sweep and related method for protecting such sweep that overcome some of the problems and shortcomings of the prior art.

Another object of the invention is provide an agricultural sweep having improved resistance to erosion resulting from interaction with the soil.

Another object of the invention is provide a method for applying hardfacing material to an agricultural sweep that will reduce the amount of hardfacing material required to provide maximum protection.

Still another object of the invention is to provide an agricultural sweep having layers of hardfacing material which are not diluted or are minimally diluted by the parent metal from which the sweep is made.

Yet another object of the invention is to provide an improved sweep and related method that applies hardfacing material in recognition of the way in which soil imposes pressure upon the surface of the sweep. How these and other objects are accomplished will become apparent from the following descriptions and from the drawings.

SUMMARY OF THE INVENTION

The invention involves an improvement to an agricultural sweep having a main body with a cutting edge including a tip and winged portions extending away from the tip. The tip and winged portions have hardfacing material thereon to enhance the longevity and wear properties of the sweep.

It has been found that as a sweep is drawn through the earth, the soil imposes a pressure gradient across the tip and winged portions. That is, points on the tip and on the winged portions are subjected to different pressures. Pressures at the tip are higher than those at the back extremities of the winged portions and the areas of higher pressure at the tip are greater than similar areas along the winged portions and at the back extremities of such edges. The characteristics of such pressure gradient are determined using finite element analysis.

The improvement involves the distribution of hardfacing material on the sweep so that the area covered by hardfacing material on the tip is wider than the area covered on the winged portions. Such application conforms the location of hardfacing material on the sweep to the soil pressure gradient along the cutting edge as the sweep is drawn through the soil.

In a more specific aspect of the invention, the sweep includes a shank that extends from the main body portion and has holes for receiving attaching bolts therethrough. The sweep includes a barrier of hardfacing material between the hole and the main body portion, thereby shielding the bolt from the abrasive effect of soil passing over the sweep. In a specific version of such embodiment, the barrier is on the shank and is generally V-shaped.

In a preferred embodiment of the invention, the cutting edge of the sweep includes first and second layers or coatings of hardfacing material. In a specific version of such embodiment, the cutting edge has a forward extremity, the first coating is substantially coincident with the forward extremity and the second coating is spaced slightly from the forward extremity.

In still a more specific version of this embodiment, the second coating is applied atop the first coating. To put it in other words, the first coating is between the sweep "parent" metal and the second coating.

In another embodiment of the invention, highly preferred, a third coating of hardfacing material is applied on top of the second. In such variation, the first coating is substantially coincident with or spaced slightly from the sweep forward extremity, the second coating is spaced slightly from such forward extremity and the third coating is spaced slightly from the forward boundary of the second coating. In a more particular version of this variation, the second coating is applied to overlap the first coating, and the third coating is applied to overlap the second. In other words, the first coating is between the sweep "parent" metal and the second coating, and the second coating is between the first and third coatings.

In another aspect of the invention using hardfacing material on both the tip and winged portions, the material on the tip covers an area that, measured along the tip ridge in the direction of sweep travel, is wider than the area covered on the winged portions measured generally perpendicularly to the forward extremity of the cutting edge. Such coverage conforms the distribution of hardfacing material to the soil pressure gradient along the cutting edge.

Another aspect of this invention involves a method for applying hardfacing material to an agricultural sweep having a face. The method includes determining the pressure gradient on the face of the sweep that results from soil passing across the face and then applying hardfacing material to those portions of the face at which the gradient exceeds a predetermined value.

The agricultural sweep has a tip and winged portions with a trailing portion away from the tip. In a preferred method, the hardfacing material is applied to both the tip and winged portions. This application of hardfacing material to the sweep is such that the distribution of material on the tip is wider than the distribution on the winged portions.

In a more specific aspect of the method, two coats of hardfacing material are applied to only the tip. In another more specific aspect, two coats of hardfacing material are applied to only the winged portions of the sweep while in yet another more specific aspect, two coats of hardfacing material are applied to both the tip and winged portions of the sweep.

In yet another aspect of the inventive method, three coats of hardfacing material are applied to only the tip. In a more specific version of this aspect, three coats of hardfacing material are applied only to the winged portions of the sweep while in yet another more specific version, three coats of hardfacing material are applied to both the tip and the winged portions of the sweep.

In still another aspect of the inventive method, the face of the agricultural sweep has a forward extremity and the method of application is such that the first coating is substantially coincident with the forward extremity and the second coating is spaced slightly rearward from the forward extremity and is atop the first coating, and the third coating is atop the second.

Most preferably, hardfacing material is applied using pulsed gas metal arc welding (PGMAW). This technique is preferred since it uses less hardfacing material and has a noticeably-diminished tendency to melt the underlying parent metal. Avoidance of parent metal melting is preferred because such metal is softer than the hardfacing material and dilutes such material.

Other details of the new sweep and related method are set forth in the following detailed description and in the drawings.

DETAILED DESCRIPTIONS OF THE PREFERRED EMBODIMENTS

Figure 1:
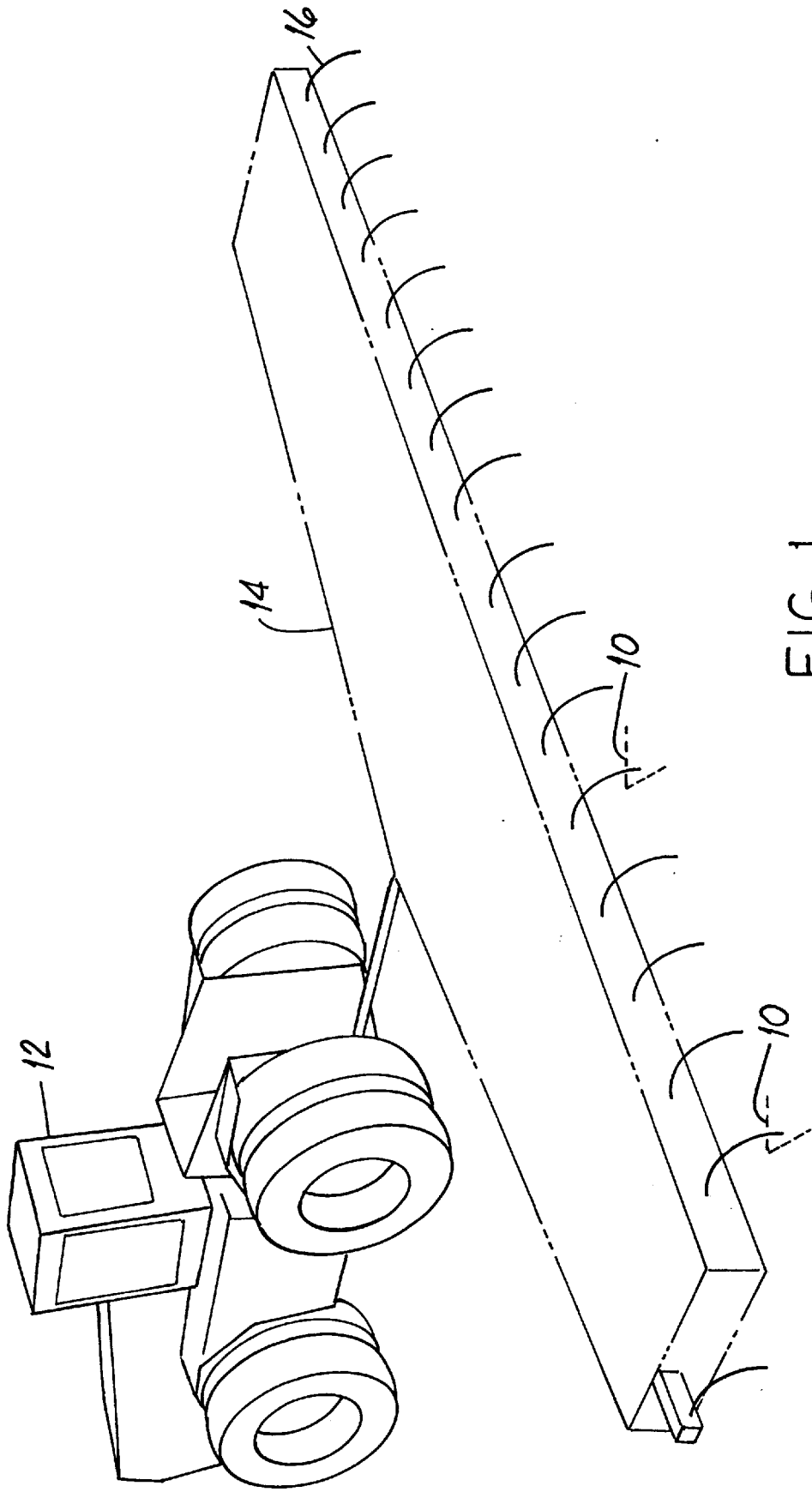
FIG. 1 is a perspective view showing a towed gang implement of the type with which agricultural sweeps are used.

Before describing the new sweep 10 and related method, it will be helpful to have an understanding of how agricultural sweeps 10 are used. FIG. 1 shows a tractor 12 pulling a gang-type tillage implement 14. Such implement 14 has a number of curved, downwardly-extending shanks 16, each of which has a sweep 10 attached thereto at the shank 16 lower end. The implement 14 and shanks 16 are positioned in such a way that the sweeps 10 "run" just below the surface of the field being cultivated (two such exemplary sweeps are outlined in FIG. 1). As noted above, weeds are severed below the surface and moisture evaporation paths are broken up.

Figure 2:
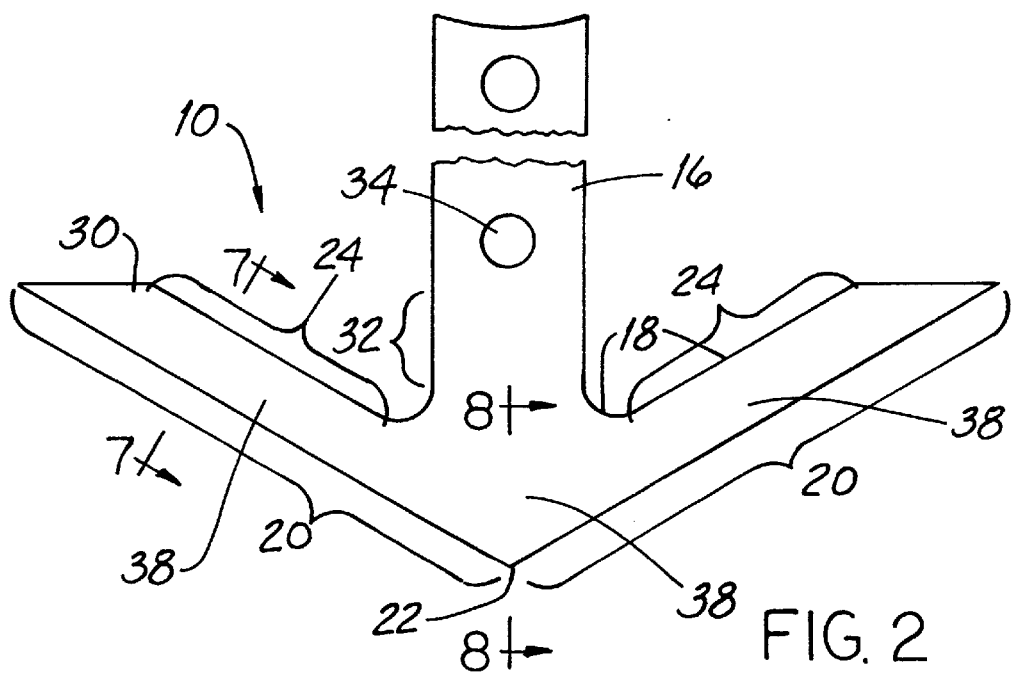
FIG. 2 is a perspective of an agricultural sweep showing a shank with attachment bolt receiving holes.
Figure 3:
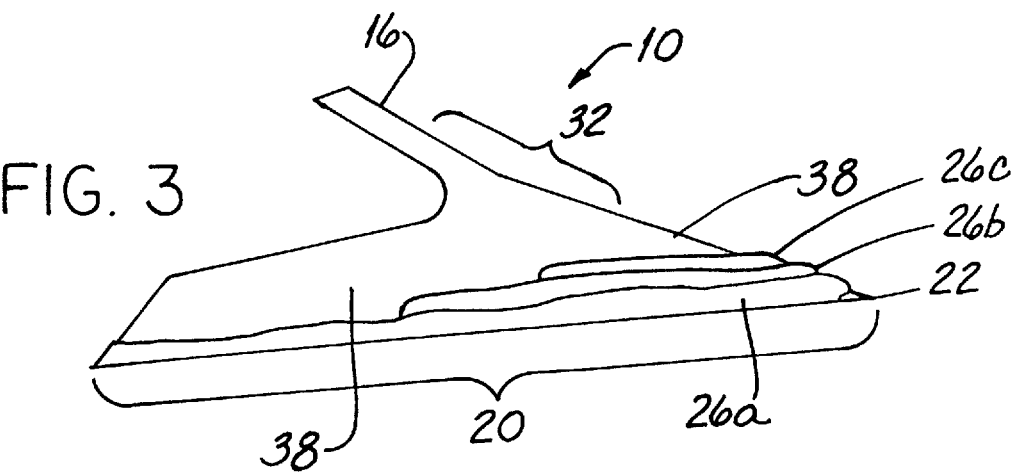
FIG. 3 is a side view of an agricultural sweep showing multiple layers of hardfacing material applied to high pressure wear areas.

Referring next to FIGS. 2 and 3, the invention involves an improved agricultural sweep 10 and a related method. The sweep 10 has a main body 18 with a cutting edge 20 including a front tip 22 and winged portions 24 extending laterally and angularly away from the tip 22. The tip 22 and winged portions 24 have hardfacing material 26 applied thereto to enhance the longevity and wear properties of the sweep 10.

As explained below, a sweep 10 being drawn through the earth has a pressure gradient 28 imposed across the tip 22 and winged portions 24 by the soil through which the sweep 10 moves. That is, points on the tip 22 and on the winged portions 24 are subjected to different pressures.

Figure 4:
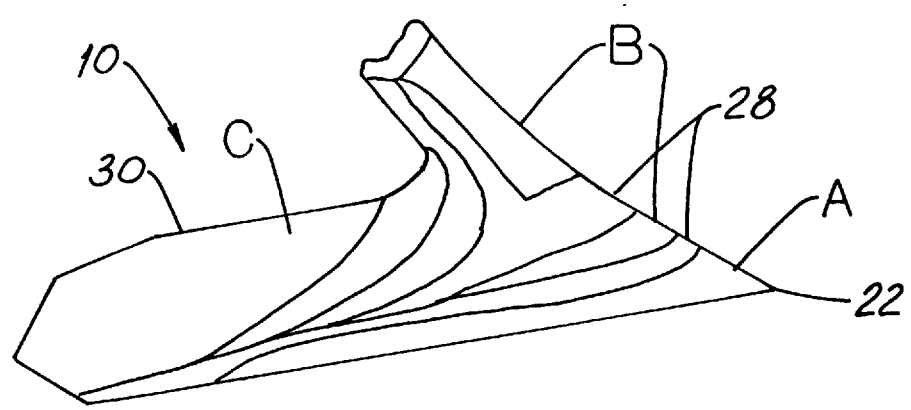
FIG. 4 is a side view of an agricultural sweep showing the various pressure regions that are exerted on the sweep as a result of it being dragged through the soil.

As shown in FIG. 4, pressures at the tip 22 are higher than those at the back extremities 30 of the winged portions 24 and the areas of higher pressure at the tip 22 are greater than similar areas along the winged portions 24 and at its back extremities 30. And even considering the tip 22 itself and the region 32 above the tip 22 (i.e., the region between the point and the shank), there is a notable difference between the maximum and minimum pressure in such region 32. In a specific pressure gradient measurement, as shown in FIG. 4, the pressure at strip A was on the order of 0.476E+06 Pascals, the pressure at strip B was on the order of 0.346E+06 Pascals, and the pressure at strip C was on the order of 0.853E+05 Pascals. Such measurements—which were made on a sweep 10 travelling 5 mph through the soil—showed that the pressure was the greatest on the front part of the shank 16 and the cutting edge 20 of the sweep. Such pressure decreased to an almost negligible amount on the back extremities 30 of the winged portions 24.

In an aspect of the invention, the distribution of hardfacing material 26 on the sweep 10 is in a way that the area covered by hardfacing material 26 on the tip 22 (as measured along the tip ridge in the direction of sweep travel), is wider than the area covered on the winged portions 24 as measured generally perpendicularly to the forward extremity 38 of the cutting edge 20. Thus, the location of hardfacing material 26 on the sweep 10 generally conforms to the soil pressure gradient 28 along the cutting edge 20 as the sweep 10 is drawn through the soil.

And there are other ways to consider the way in which hardfacing material 26 is applied other than in terms of the magnitude of a sweep pressure gradient 28. Another such way involves the area over which the hardfacing material 26 is applied.

FIG. 3 shows another aspect of the invention involving the use of a layer of hardfacing material 26a, e.g., a first layer, on both the tip 22 and winged portions 24. The layer of material 26a on the tip 22 covers an area that, measured along the tip ridge in the direction of sweep travel, is wider than the area covered on the winged portions 24 measured generally perpendicularly to the forward extremity 38 of the cutting edge 20. Such coverage conforms the distribution of the layer of hardfacing material 26a to the soil pressure gradient 28 along the cutting edge 20.

Figure 7:
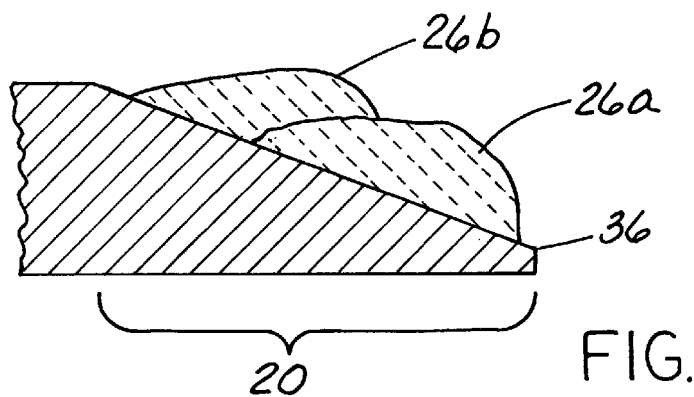
FIG. 7 is a sectional view of one wing of an agricultural sweep taken along line 7—7 of FIG. 2 showing the underlying base material of the sweep and two layers of hardfacing material applied along the cutting edge of the sweep.

FIG. 3 also shows second and third layers of hardfacing material 26b, 26c, respectively, applied on top of the first layer of hardfacing 26a. As with the first layer of hardfacing 26a, the layers 26b and 26c are applied in such a manner so as to conform with the pressure distribution along the sweep. And as also shown in FIGS. 3 and 7, the first layer of hardfacing material 26a terminates at the cutting edge 20 and at the forward extremity 36, the second layer of hardfacing material 26b is above the first layer and the third layer of hardfacing material 26c is above the second layer. Consistent with the pressure gradient pattern shown in FIG. 4, each of the layers of hardfacing material 26a, 26b, 26c extends in a continuum around the tip 22 and along or adjacent to the cutting edge 20.

Figure 5:
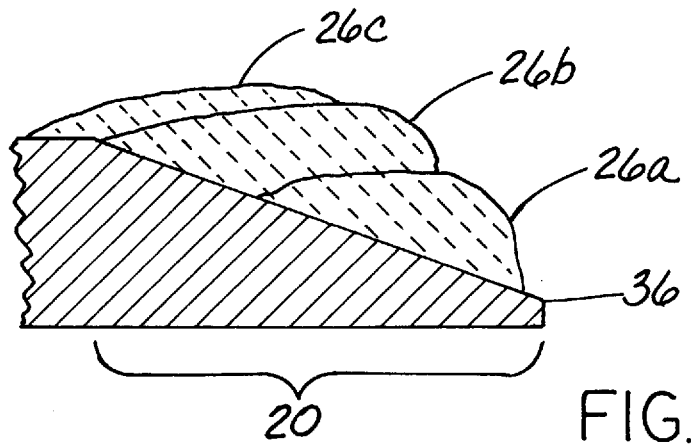
FIG. 5 is a sectional view of one wing of the agricultural sweep showing the relationship between the underlying base material of the sweep and the three layers of hardfacing material.
Figure 6:
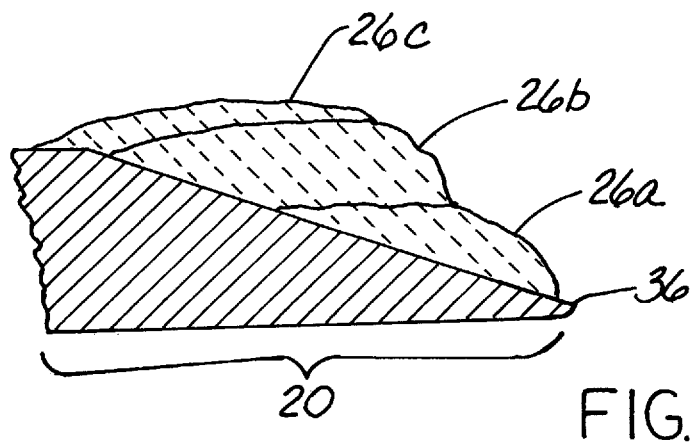
FIG. 6 is a sectional view of one wing of the agricultural sweep following use. Such view shows the self-sharpening edge of the underlying base material that makes up the sweep.

FIGS. 5 and 6, show a highly preferred embodiment of the invention where the cutting edge 20 of the sweep 10 includes first, second and third layers or coatings 26a, 26b and 26c, respectively, of hardfacing material 26. Preferably, the first layer of material 26a is of a material having a hardness in the range of 43 to 46 Rockwell C. And each of the second and third layers of material 26b, 26c is of a material having a hardness in the range of 46 to 54 Rockwell C.

In a specific version of such embodiment, as shown in FIG. 5, the cutting edge 20 has a forward extremity 36, the first coating 26a is substantially coincident with the forward extremity 36 in that it is placed anywhere from $\frac{1}{16}$ to $\frac{1}{8}$ of an inch rearward of the forward extremity. The second layer of hardfacing material 26b is then spaced slightly rearward from the beginning of the first layer of hardfacing material 26a. In still a more specific version of this embodiment, the second layer of hardfacing material 26b is applied atop the first layer of hardfacing material 26a. To put it in other words, the first layer of hardfacing material 26a is between the sweep "parent" metal and the second layer of hardfacing material 26b.

The main body 18 of the sweep 10 is made of a base metal which is softer than any layer of hardfacing material 26a, 26b, 26c. And the first layer of hardfacing material 26a is somewhat softer than the second and third layers of hardfacing material 26b, 26c, respectively. Comparing FIGS. 5 and 6, the base metal erodes or wears away as the sweep 10 moves through soil. This erosion results in a sharper exposed edge at the forward extremity 36. In other words, the sweep 10 is self-sharpening to a certain degree. (From the foregoing, it should not be concluded that none of the layers of hardfacing material 26a, 26b, 26c wear or erode. However, such wear is at a much slower rate.)

FIGS. 3 and 5 show the high preferred embodiment of the sweep 10 which has three layers of hardfacing material 26a, 26b, 26c which are in overlapping relationship but are not entirely in registry with one another. In other words, the layers of hardfacing material 26a, 26b, 26c are "terraced" from front to rear. And the layers of hardfacing material 26a, 26b, 26c are applied in areas that recognize the phenomenon of pressure gradient as generally indicated at 28 in FIG. 4.

However, it is to be appreciated that the invention is subject to variations which are within the scope of such invention. For example, two layers of hardfacing material 26a, 26b of dissimilar hardness may be used, irrespective of whether such layers are applied in recognition of a pressure gradient 28. Further, a single layer 26a applied over an area conforming to a pressure gradient 28 may also be used. And yet other variations are described below.

Another aspect of this invention involves a method for applying hardfacing material 26 to an agricultural sweep 10 having a face 38. The method includes determining the pressure gradient 28 on the face 38 of the sweep 10 that results from soil passing across the face 38 and then applying hardfacing material 26 to those portions of the face 38 at which the gradient 28 exceeds a predetermined value.

The agricultural sweep 10 has a tip 22 and winged portion 24 with a trailing portion away from the tip 22. In a preferred method, the hardfacing material 26 is applied to both the tip 22 and winged portions 24. This application of hardfacing material 26 to the sweep 10 is such that the distribution of material 26 on the tip 22 is wider (when measured along the axis of travel of the sweep) than the distribution on the winged portion 24 when measured along an axis perpendicular to the edge of the winged portion 24.)

Figure 8:
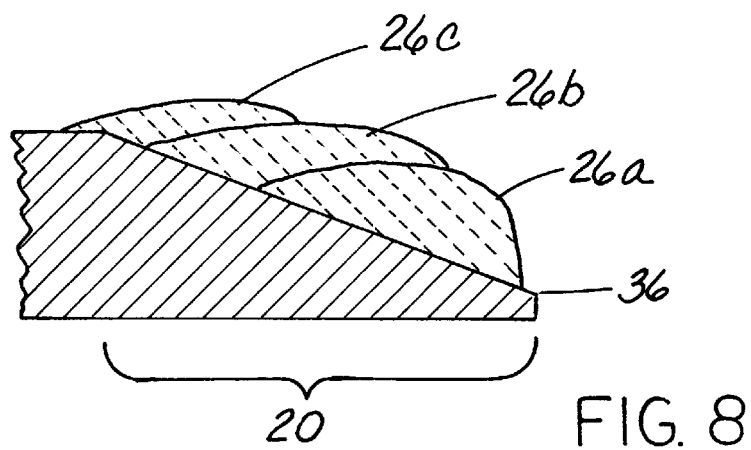
FIG. 8 is a sectional view of the tip portion of an agricultural sweep along line 8—8 of FIG. 2 showing the underlying base material of the sweep and three layers of hardfacing material applied along the cutting edge of the sweep.

In a more specific aspect of the method, three layers of hardfacing material 26a, 26b, 26c are applied only to the tip 22. As shown in FIGS. 7 and 8, respectively, the winged portion 24 may have two layers of hardfacing material 26a, 26b or three layers of hardfacing material 26a, 26b, 26c. Preferably, the second layer of material 26b is applied to overlap anywhere from about one third to about one-half of the top surface area of the layer of material 26a. And where three layers of material 26a, 26b, 26c are used, it is preferred that the third layer of material 26c overlap anywhere from about one-third to about one-half of the top surface area of the layer of material 26b.

In yet another aspect of the inventive method, the method of application is such that the first layer 26a is substantially coincident with the forward extremity 36. And the second layer 26b is spaced rearwardly from the forward extremity 36 and is atop the first layer 26a.

In all embodiments, hardfacing material 26 is most preferably applied using pulsed gas metal arc welding (PGMAW). This technique is preferred since it uses less hardfacing material 26 and has a noticeably-diminished tendency to melt the underlying parent metal. Avoidance of parent metal melting is preferred because such metal is softer than the hardfacing material 26 and dilutes such material.

As used herein, the phrase "substantially coincident" means, when referring to placement of the layer 26a with respect to with the forward extremity 36, that such layer 26a is placed in registry with such forward extremity 36 or is placed anywhere from about 1/16 to 1/8 of an inch rearward of the forward extremity.

While the principles of the invention have been shown and described in connection with but a few embodiments, it is to be understood clearly that such embodiments are by way of example and are not limiting.

What is claimed:

1. In an agricultural sweep having a main body with a tip having a forward extremity, and winged portions extending away from the tip, and wherein each winged portion has a cutting edge and the tip and winged portions have hardfacing material thereon, the improvement wherein:

the hardfacing material on the tip is applied by welding, terminates above the forward extremity and has a width;

the hardfacing material on the winged portions is applied by welding, is above the cutting edges and has a width;

the width of the hardfacing material on the tip is greater than the width of the hardfacing material on the winged portions; and the hardfacing material on the tip and on the winged portions is applied in a continuum, thereby conforming the location of hardfacing material to a soil pressure gradient.

2. In an agricultural sweep for cultivating earth, the sweep having a main body with a tip and a pair of winged portions extending laterally and angularly away from the tip, each winged portion having a generally linear cutting edge therealong, the improvement wherein:

each winged portion includes first and second weld-applied layers of hardfacing material extending along its cutting edge;

each first layer has a top surface area; and each second layer overlaps at least about one-third of the top surface area of a respective one of the first layers.

3. The agricultural sweep of claim 2 wherein each of the winged portions includes first, second, and third layers of hardfacing material, and wherein:

each second layer of hardfacing material has a top surface area; and each third layer overlaps at least about one-third of the top surface area of a respective one of the second layers.

4. The sweep of claim 2 including a forward extremity, and wherein the first layer is substantially coincident with the forward extremity and the second layer is spaced from the forward extremity.

5. The sweep of claim 4 wherein the first layer of hardfacing material is on the tip and wherein:

the first layer of hardfacing material on the tip has a width;

the first layer of hardfacing material on the winged portions has a width; and the width of the first layer of hardfacing material on the tip is greater than the width of the first layer of hardfacing material on the winged portions, thereby conforming the location of hardfacing material to a soil pressure gradient along the cutting edge.

6. A method for weld-applying hardfacing material to an agricultural sweep having a tip and a pair of winged portions extending laterally and angularly away from the tip, the tip and the winged portions defining a face, the method comprising:

determining a face pressure gradient resulting from soil passing across the face; and weld-applying hardfacing material to those parts of the face at which the gradient exceeds a predetermined value;

and wherein:

hardfacing material is weld-applied in a continuum across the tip and alone the winged portions.

7. The method of claim 6 wherein each winged portion has a trailing portion extending away from the tip and wherein hardfacing material is weld-applied on the tip to a first width; and hardfacing material is weld-applied on the trailing portion to a second width less than the first width.

8. The method of claim 6 wherein applying hardfacing material includes applying such material in first and second layers.

9. The method of claim 8 wherein applying hardfacing material includes applying such material in first, second and third layers.

10. The method of claim 9 wherein the face has a cutting edge with a forward extremity, the first layer is substantially coincident with the forward extremity, the second layer has a starting point that is spaced from the forward extremity, and the third layer is spaced from the starting point of the second layer.

11. The method of claim 8 wherein the sweep has a cutting edge with a forward extremity, the first layer is substantially coincident with the forward extremity and the second layer is spaced rearwardly from the forward extremity.

12. The method of claim 8 wherein the first layer has a top surface area, the second layer is atop the first layer and overlaps no more than about one-half of the top surface area of the first layer.

13. The method of claim 8 wherein:

the first layer extends a first length along each of the winged portions;

the second layer extends a second length along each of the winged portions; and the first length is greater than the second length.

14. The method of claim 9 wherein:

the first layer extends a first length along each of the winded portions;

the second layer extends a second length along each of the winged portions;

the third layer extends a third length along each of the winced portions; and the first length is greater than the second length which is greater than the third length.

15. The method of claim 6 wherein the hardfacing material is applied to the face of the agricultural sweep using pulsed gas metal arc welding.

* * * * *